US010828988B2

(12) United States Patent
Ahiko et al.

(10) Patent No.: US 10,828,988 B2
(45) Date of Patent: Nov. 10, 2020

(54) COLLECTED CURRENT MONITORING DEVICE

(71) Applicant: CENTRAL JAPAN RAILWAY COMPANY, Nagoya (JP)

(72) Inventors: Yuichi Ahiko, Nagoya (JP); Kotaro Nakamura, Nagoya (JP); Hiroki Shimoyama, Nagoya (JP)

(73) Assignee: CENTRAL JAPAN RAILWAY COMPANY, Nagoya (JP)

( * ) Notice: Subject to any disclaimer, the term of this patent is extended or adjusted under 35 U.S.C. 154(b) by 283 days.

(21) Appl. No.: 16/081,223

(22) PCT Filed: Mar. 1, 2017

(86) PCT No.: PCT/JP2017/008123
§ 371 (c)(1),
(2) Date: Aug. 30, 2018

(87) PCT Pub. No.: WO2017/150618
PCT Pub. Date: Sep. 8, 2017

(65) Prior Publication Data
US 2019/0092172 A1 Mar. 28, 2019

(30) Foreign Application Priority Data
Mar. 1, 2016 (JP) ................. 2016-038967

(51) Int. Cl.
B60L 3/00 (2019.01)
B60L 9/24 (2006.01)
(Continued)

(52) U.S. Cl.
CPC .............. B60L 3/0038 (2013.01); B60L 3/00 (2013.01); B60L 3/0069 (2013.01); B60L 3/12 (2013.01);
(Continued)

(58) Field of Classification Search
CPC ........ B60L 3/00; B60L 3/0023; B60L 3/0038; B60L 5/00; B60L 5/34; B60L 5/36; B60L 5/38; B60L 5/39
See application file for complete search history.

(56) References Cited

U.S. PATENT DOCUMENTS

2010/0176655 A1* 7/2010 Yokozutsumi ............ B60L 3/00
307/9.1
2015/0266384 A1* 9/2015 Kitanaka ................. B60L 15/20
318/400.3

(Continued)

FOREIGN PATENT DOCUMENTS

JP 4386253 12/2009

OTHER PUBLICATIONS

English translation of International Preliminary Report on Patentability and Written Opinion from corresponding PCT Appln. No. PCT/JP2017/008123, dated Sep. 4, 2018.
(Continued)

Primary Examiner — Robert J McCarry, Jr.
(74) Attorney, Agent, or Firm — Grossman, Tucker, Perreault & Pfleger, PLLC

(57) ABSTRACT

Provided is a collected current monitoring device. A transformer current acquisition unit acquires a current value $I_p$ of a current flowing through a part of a plurality of transformers. A total collected current calculation unit calculates a current value $I_{all}$ of a collected current supplied by a plurality of current collectors from the current value $I_p$ by using a following Equation (1): $I_{all}=I_p\times(M_{all}/M_p)$. A collected current acquisition unit acquires a current value $I_X$ of a collected current supplied by the current collector(s) other than one current collector. The collected current calculation unit calculates a current value $I_Y$ of a collected current
(Continued)

supplied by the one current collector by subtracting the current value $I_X$ from the current value $I_{all}$.

6 Claims, 11 Drawing Sheets

(51) Int. Cl.
  *B60L 3/12*       (2006.01)
  *B60L 5/02*       (2006.01)
  *B60L 5/39*       (2006.01)
  *H01F 27/42*      (2006.01)

(52) U.S. Cl.
  CPC  *B60L 5/02* (2013.01); *B60L 5/39* (2013.01); *B60L 9/24* (2013.01); *H01F 27/427* (2013.01); *B60L 2200/26* (2013.01)

(56) References Cited

U.S. PATENT DOCUMENTS

2016/0114683 A1* 4/2016 Bruce ............... B60L 50/53
                                            701/22
2016/0339935 A1* 11/2016 Fournier ........... B61L 3/006

OTHER PUBLICATIONS

English translation of International Search Report from corresponding PCT Appln. No. PCT/JP2017/008123, dated Jun. 6, 2017.
Written Opinion from corresponding PCT Appln. No. PCT/JP2017/008123, dated Jun. 6, 2017. English translation to follow.

* cited by examiner

COLLECTED CURRENT MONITORING DEVICE

CROSS-REFERENCE TO RELATED APPLICATION

The present international application claims the benefit of Japanese Patent Application No. 2016-38967 filed on Mar. 1, 2016 with the Japan Patent Office, and the entire disclosure of Japanese Patent Application No. 2016-38967 is incorporated herein by reference in this international application.

FIELD

The present disclosure relates to a collected current monitoring device.

BACKGROUND

A railway vehicle includes a current collector on its roof. The current collector has a structure for supporting a collector head with a collector arm. The collector head includes a collector head body and a contact strip attached to an upper surface of the collector head body. The current collector presses the contact strip of the collector head against a lower edge of an overhead wire and takes a collected current from the overhead wire into the railway vehicle (see Patent Document 1).

PRIOR ART DOCUMENTS

Patent Documents

Patent Document 1: Japanese Patent No. 4386253

SUMMARY

Problems to be Solved by the Invention

In a railway vehicle including a plurality of current collectors, a state where a certain current collector cannot collect currents among the plurality of current collectors may be referred to as electric line separation. When there is frost icing on the overhead wire, electric line separation may occur in the current collector provided on a front portion of the railway vehicle in a traveling direction. Even in this case, the icing frost can be removed by the current collector provided on the front portion of the railway vehicle in the traveling direction. Therefore, the current collector provided on a rear portion of the railway vehicle in the traveling direction can often collect currents.

When a certain current collector is in an electric line separation state and the other current collector also causes the electric line separation due to some reasons, an arc can occur and the collector head body can be damaged. Since the state of the electric line separation is a state where an arc is likely to occur, it is necessary to detect the state of the electric line separation.

Even when a certain current collector is in the state of the electric line separation, an instantaneous waveform of the collected currents in the other current collector is similar to a normal waveform. Therefore, the state of the electric line separation cannot be detected from the instantaneous waveform of the collected current in the other current collector.

In one aspect of the present disclosure, it is preferable to provide a collected current monitoring device capable of detecting electric line separation.

Means for Solving the Problems

One aspect of the present disclosure is a collected current monitoring device used in a railway vehicle including a plurality of transformers arranged in parallel and a plurality of current collectors configured to supply a collected current to the plurality of transformers. The collected current monitoring device includes: a transformer current acquisition unit configured to acquire a current value $I_p$ of a current flowing through a part of the plurality of transformers; a total collected current calculation unit configured to calculate a current value $I_{all}$ of a collected current supplied by the plurality of current collectors from the current value $I_p$ acquired by the transformer current acquisition unit by using a following Equation (1); a collected current acquisition unit configured to acquire a current value $I_X$ of a collected current supplied by a current collector or current collectors other than one current collector of the plurality of current collectors; and a collected current calculation unit configured to calculate a current value $I_Y$ of a collected current supplied by the one current collector by subtracting the current value $I_X$ acquired by the collected current acquisition unit from the current value $I_{all}$ calculated by the total collected current calculation unit.

$$I_{all} = I_p \times (M_{all}/M_p)$$ Equation (1)

(In Equation (1), $M_p$ is the number of main converters connected to the part of the plurality of transformers, and $M_{all}$ is the sum total of the number of main converters connected to any one of the plurality of transformers.)

The collected current monitoring device of the present disclosure can acquire the current values $I_X$ and $I_Y$ even when the current value $I_Y$ is not necessarily measured directly. The electric line separation can be detected by using the current values $I_X$ and $I_Y$.

BRIEF DESCRIPTION OF THE DRAWINGS

FIG. 3 is an explanatory diagram showing an arrangement of a current collector, a main transformer, a current sensor, and the like.

FIG. 8 is an explanatory diagram showing an arrangement of a current collector, a main transformer, a current sensor, and the like.

FIG. 9 is an explanatory diagram showing an arrangement of a current collector, a main transformer, a current sensor, and the like.

FIG. 10 is an explanatory diagram showing an arrangement of a current collector, a main transformer, a current sensor, and the like.

EXPLANATION OF REFERENCE NUMERALS

1 . . . collected current monitoring device, 3 . . . CPU, 5 . . . memory, 7 . . . transformer current acquisition unit, 9 . . . total collected current calculation unit, 11 . . . collected current acquisition unit, 13 . . . collected current calculation unit, 15 . . . current value determination unit, 17 . . . first RMS calculation unit, 19 . . . second RMS calculation unit, 21 . . . abnormality determination unit, 23 . . . abnormality output unit, 25 . . . information acquisition unit, 27 . . . setting unit, 29 . . . speed sensor, 31 . . . ground transponder, 33 . . . ATC, 35 . . . monitoring device, 37, 39, and 79 . . . current collector, 41, 43, 45, 47, 83, and 85 . . . current sensor, 49 . . . control transmission device, 51 . . . main converter group, 53, 55, 57, and 59 . . . main transformer, 60 . . . current supply path, 61 . . . main path, 63, 65, 67, and 69 . . . branch path, 71, 73, and 81 . . . current supply point, 75 and 7 . . . abnormal region

DETAILED DESCRIPTION

Embodiments of the present disclosure will be described with reference to the drawings.

First Embodiment

1. Configuration of Collected Current Monitoring Device 1

Figure 1:
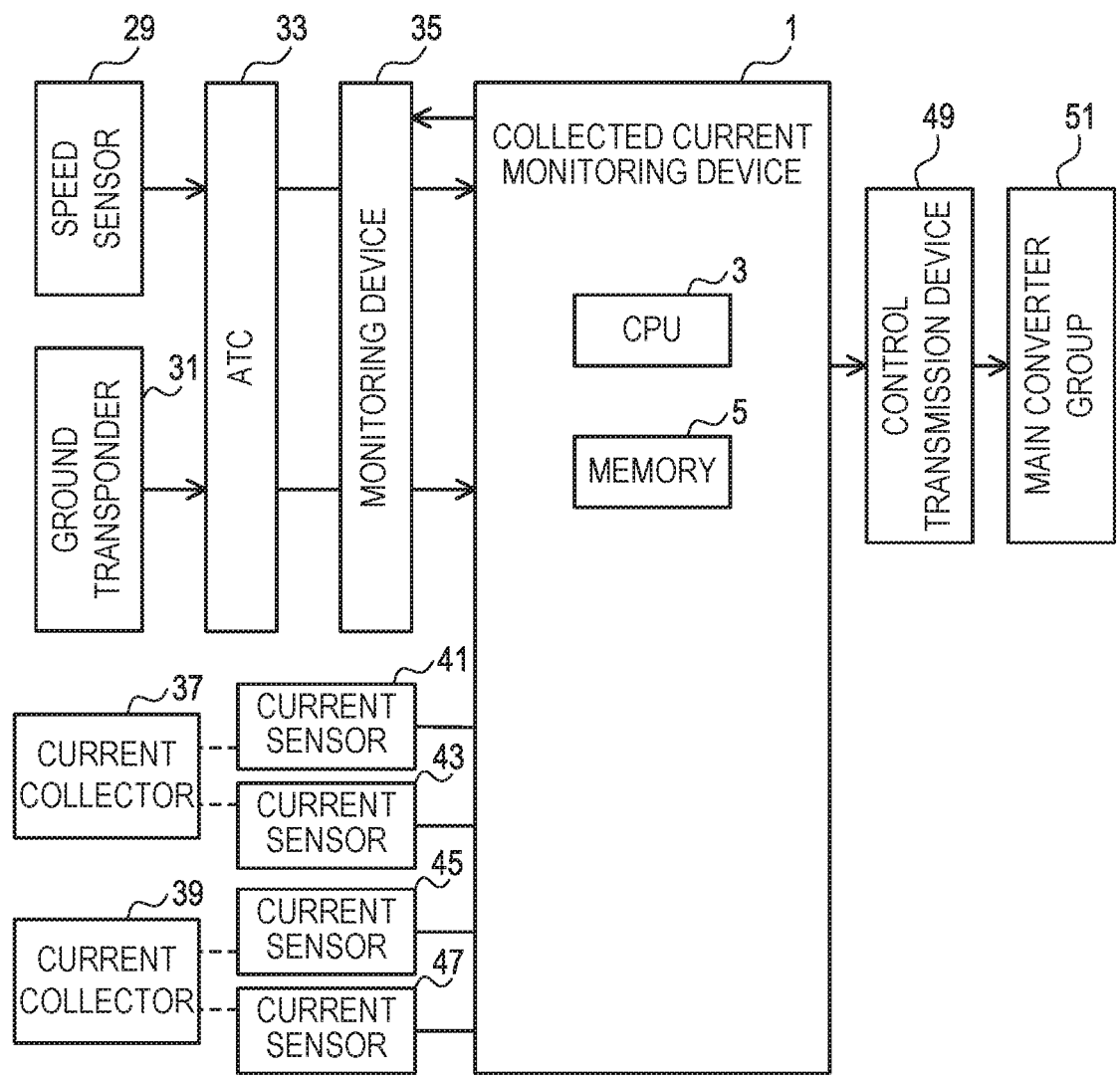
FIG. 1 is a block diagram showing a configuration of a collected current monitoring device and other devices.

A configuration of a collected current monitoring device 1 will be described with reference to FIGS. 1 to 3. The collected current monitoring device 1 is a device mounted on a railway vehicle. As shown in FIG. 1, the collected current monitoring device 1 is constituted mainly by a well-known microcomputer including a CPU 3 and a memory 5. Examples of the memory 5 may include semiconductor memories such as a RAM, a ROM, and a flash memory. Various functions of the collected current monitoring device 1 are achieved as the CPU 3 executes programs stored in the memory 5.

Figure 2:
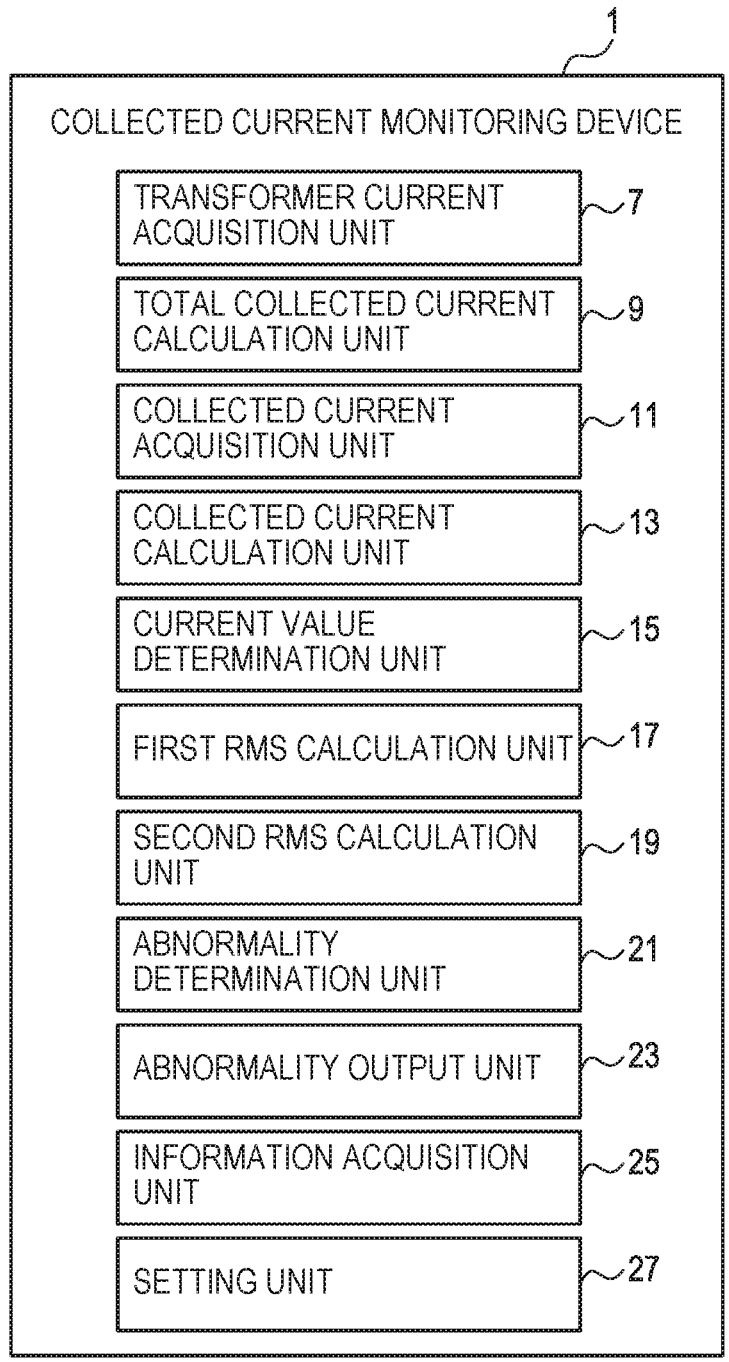
FIG. 2 is a block diagram showing a functional configuration of the collected current monitoring device.
Figure 3:
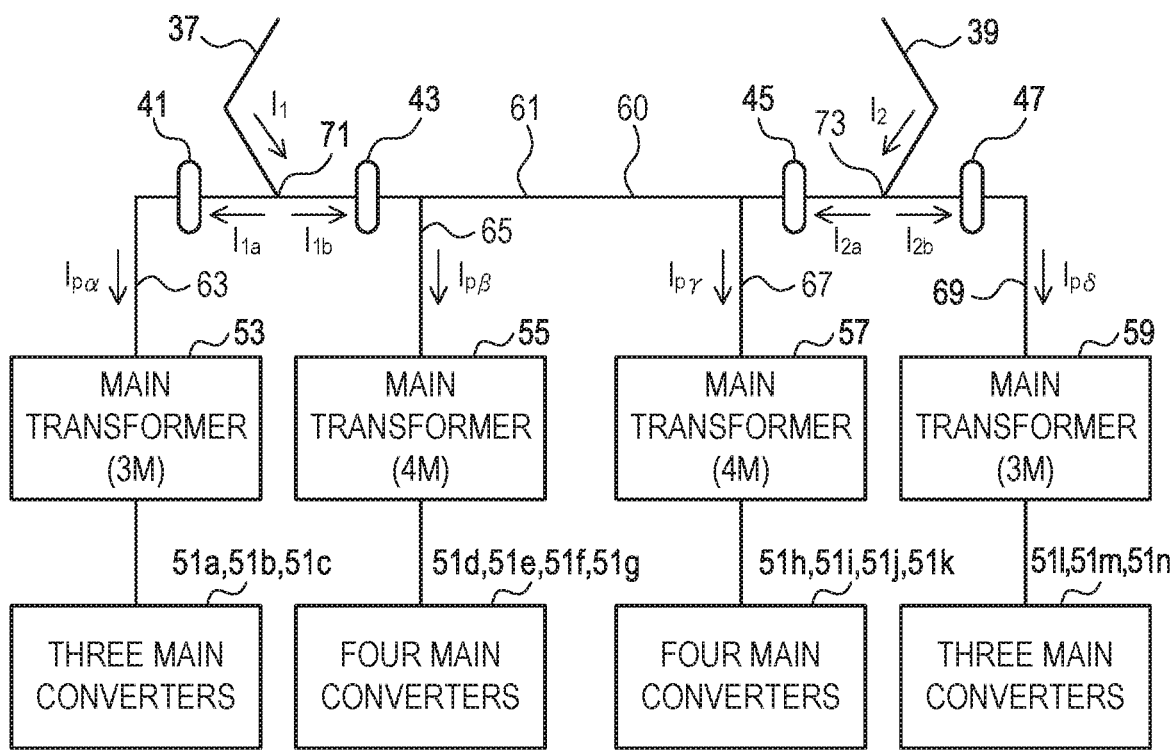
Figure 4:
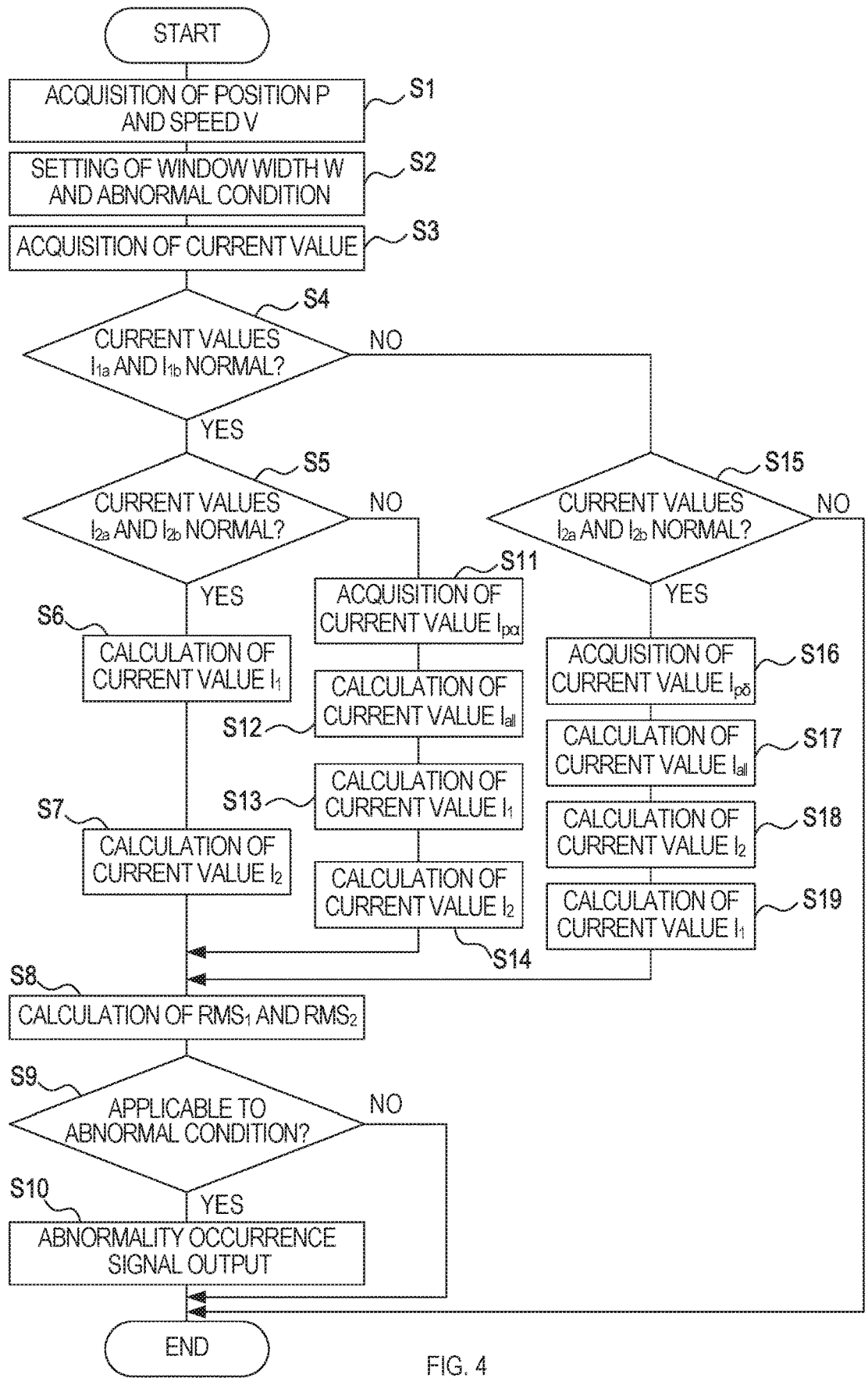
FIG. 4 is a flowchart showing processing executed by the collected current monitoring device.

As shown in FIG. 2, as a configuration of functions achieved as the CPU 3 executes the programs, the collected current monitoring device 1 includes a transformer current acquisition unit 7, a total collected current calculation unit 9, a collected current acquisition unit 11, a collected current calculation unit 13, a current value determination unit 15, a first RMS calculation unit 17, a second RMS calculation unit 19, an abnormality determination unit 21, an abnormality output unit 23, an information acquisition unit 25, and a setting unit 27.

As shown in FIG. 1, in addition to the collected current monitoring device 1, the railway vehicle includes a speed sensor 29, a ground transponder 31, an automatic train stop device (ATC, or Automatic Train Control) 33, a monitoring device 35, two current collectors 37 and 39, four current sensors 41, 43, 45, and 47, a control transmission device 49, and a main converter group 51. The two current collectors 37 and 39 correspond to a plurality of current collectors.

The speed sensor 29 senses a speed V of the railway vehicle and sends the sensed speed V to the ATC 33. The ATC 33 performs time-integration of the speed V to estimate a position P of the railway vehicle constantly. The ground transponder 31 sends position correction information to the ATC 33. The position correction information is accurate position information of the railway vehicle. The ATC 33 appropriately corrects the position P, which is estimated as described above, by using the position correction information. The ATC 33 sends the speed V and the position P to the collected current monitoring device 1 via the monitoring device 35. The speed V and the position P correspond to railway vehicle information. The monitoring device 35 displays the speed V and the position P.

The current collectors 37 and 39, the current sensors 41, 43, 45, and 47, and the arrangement of the configuration related thereto will be described with reference to FIG. 3. The railway vehicle includes four main transformers 53, 55, 57, and 59. The four main transformers 53, 55, 57, and 59 correspond to a plurality of transformers. The numbers of main converters connected to the main transformers 53, 55, 57, and 59 are respectively three, four, four, and three.

The main transformer 53 supplies currents to the three main converters 51$a$, 51$b$, and 51$c$. The main transformer 55 supplies currents to the four main converters 51$d$, 51$e$, 51$f$, and 51$g$. The main transformer 57 supplies currents to the four main converters 51$h$, 51$i$, 51$j$, and 51$k$. The main transformer 59 supplies currents to the three main converters 51$l$, 51$m$, and 51$n$. The main converter group 51 includes the main converters 51$a$ to 51$n$.

The railway vehicle includes a current supply path 60. The main transformers 53, 55, 57, and 59 are connected to the current supply path 60 in parallel. The current collectors 37 and 39 supply collected currents to the main transformers 53, 55, 57, and 59 via the current supply path 60.

The current supply path 60 includes a main path 61 and branch paths 63, 65, 67, and 69. The branch path 63 leads from the main path 61 to the main transformer 53. The branch path 65 leads from the main path 61 to the main transformer 55. The branch path 67 leads from the main path 61 to the main transformer 57. The branch path 69 leads from the main path 61 to the main transformer 59.

The current collector 37 is provided in the n-th car of the railway vehicles, and the current collector 39 is provided in the m-th car of the railway vehicles. n and m are natural numbers in the range from 1 to 16, and n is smaller than m. The current collector 37 supplies a collected current to a current supply point 71 between a point connected to the branch path 63 and a point connected to the branch path 65 in the main path 61. A current value of the collected current that the current collector 37 supplies to the current supply point 71 is assumed to be $I_1$.

The current collector 39 supplies a collected current to a current supply point 73 located between a point connected to the branch path 67 and a point connected to the branch path 69 in the main path 61. A current value of the collected current that the current collector 39 supplies to the current supply point 73 is assumed to be $I_2$. A current value of all the collected currents supplied by the current collectors 37 and 39 is assumed to be $I_{all}$. The current value $I_{all}$ is the sum of the current value $I_1$ and the current value $I_2$.

The current sensor 41 is provided between the current supply point 71 and a point connected to the branch path 63 in the main path 61. The current sensor 43 is provided between the current supply point 71 and a point connected to the branch path 65 in the main path 61. The current sensor 45 is provided between the current supply point 73 and a point connected to the branch path 67 in the main path 61. The current sensor 47 is provided between the current supply point 73 and a point connected to the branch path 69 in the main path 61.

Assume that a current value sensed with the current sensor 41 is $I_{1a}$. Assume that a current value sensed with the current sensor 43 is $I_{1b}$. Assume that a current value sensed with the current sensor 45 is $I_{2a}$. Assume that a current value sensed with the current sensor 47 is $I_{2b}$. The sum of the current value $I_{1a}$ and the current value $I_{1b}$ is equal to the current value $I_1$. The sum of the current value $I_{2a}$ and the current value $I_{2b}$ is equal to the current value $I_2$. Each of the current sensors 41, 43, 45, and 47 sends the sensed current value to the collected current monitoring device 1.

A current value of the current that passes through the branch path 63 and that is supplied to the main transformer 53 is assumed to be $I_{p\alpha}$. A current value of the current that passes through the branch path 65 and that is supplied to the main transformer 55 is assumed to be $I_{p\beta}$. A current value of the current that passes through the branch path 67 and that is supplied to the main transformer 57 is assumed to be $I_{p\gamma}$. A current value of the current that passes through the branch path 69 and that is supplied to the main transformer 59 is assumed to be $I_{p\delta}$. The current values $I_{p\alpha}$, $I_{p\beta}$, $I_{p\gamma}$, and $I_{p\delta}$ each correspond to a current value $I_p$ of a current flowing through a part of the transformers. The current value $I_{p\delta}$ is equal to the current value $I_{1a}$. The current value $I_{p\alpha}$ is equal to the current value $I_{2b}$. The sum total of the current value $I_{p\alpha}$, the current value $I_{p\beta}$, the current value $I_{p\gamma}$, and the current value $I_{p\delta}$ is equal to the sum of the current value $I_1$ and the current value $I_2$ (i.e., the current value $I_{all}$).

Returning to FIG. 1, the monitoring device 35 and the control transmission device 49 receive an abnormality occurrence signal (described below) output from the collected current monitoring device 1. The control transmission device 49 transmits the abnormality occurrence signal to the main converter group 51 when the control transmission device 49 receives the abnormality occurrence signal. The monitoring device 35 is provided in the driver's seat. The train driver of the railway vehicle can see the display image of the monitoring device 35. The monitoring device 35 displays an abnormality notification image when the monitoring device 35 receives the abnormality occurrence signal. The abnormality notification image is an image peculiar to the time when the abnormality occurrence signal is received. The main converter group 51 performs notch limitation when the abnormality occurrence signal is transmitted. The notch limitation is a control that limits the speed or acceleration of the railway vehicle.

2. Processing Executed by Collected Current Monitoring Device 1

Processing executed by the collected current monitoring device 1 repeatedly at specified time intervals will be described with reference to FIGS. 4 to 7. In Step 1 in FIG. 4, the information acquisition unit 25 acquires the position P and the speed V from the ATC 33.

Figure 5:
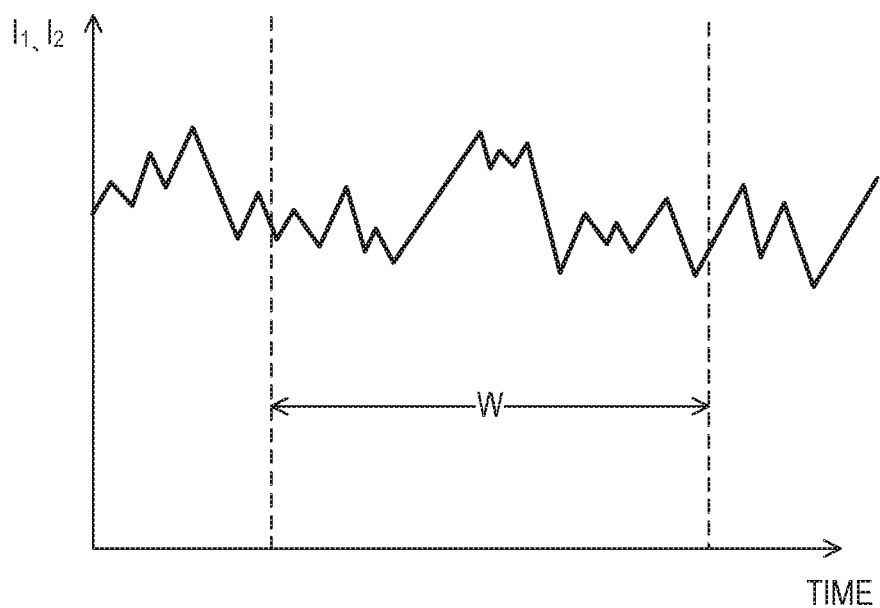
FIG. 5 is an explanatory diagram showing a window width W.

In Step 2, the setting unit 27 sets the window width W and the abnormal condition according to the position P and the speed V acquired in Step 1. The window width W means length of an integration interval at the time when a root mean square $RMS_1$ and a root mean square $RMS_2$ are calculated in Step 8 described below as shown in FIG. 5. The unit of the window width W is msec. The window width W corresponds to a setting item. As the window width W increases, the combination of the root mean square $RMS_1$ and the root mean square $RMS_2$ becomes less likely to satisfy the abnormal condition in Step 9 described below.

Figure 6:
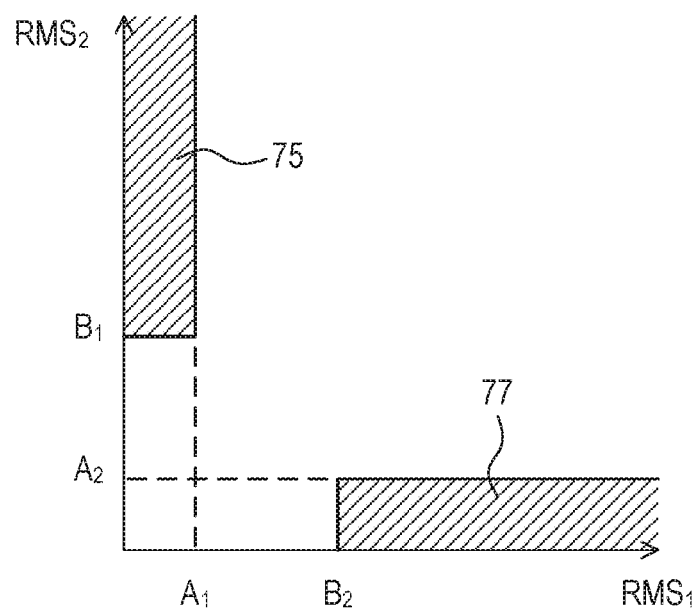
FIG. 6 is an explanatory diagram showing an abnormal condition.

The abnormal condition is a condition that the combination of the root mean square $RMS_1$ and the root mean square $RMS_2$ is within an abnormal region 75 or an abnormal region 77 shown in FIG. 6. FIG. 6 represents a two-dimensional space where the horizontal axis represents the magnitude of the root mean square $RMS_1$ and the vertical axis represents the magnitude of the root mean square $RMS_2$.

In the two-dimensional space shown in FIG. 6, the abnormal region 75 is a region in which the root mean square $RMS_1$ is not more than a threshold value $A_1$ and the root mean square $RMS_2$ is not less than a threshold value $B_1$. The abnormal region 77 is a region in which the root mean square $RMS_1$ is not less than a threshold value $B_2$ and the root mean square $RMS_2$ is not more than a threshold value $A_2$.

The abnormal condition is satisfied when the root mean square $RMS_1$ is not more than the threshold value $A_1$ and the root mean square $RMS_2$ is not less than the threshold value $B_1$.

Also, the abnormal condition is satisfied when the root mean square $RMS_1$ is not less than the threshold value $B_2$ and the root mean square $RMS_2$ is not more than the threshold value $A_2$.

All of the threshold values $A_1$, $A_2$, $B_1$, and $B_2$ are positive values. The threshold value $B_1$ is larger than the threshold values $A_1$ and $A_2$. The threshold value $B_2$ is larger than the threshold values $A_1$ and $A_2$. The threshold value $A_1$ and the threshold value $A_2$ may be the same value or different values. The threshold value $B_1$ and the threshold value $B_2$ may be the same value or different values. The abnormal condition corresponds to a setting item.

Figure 7:
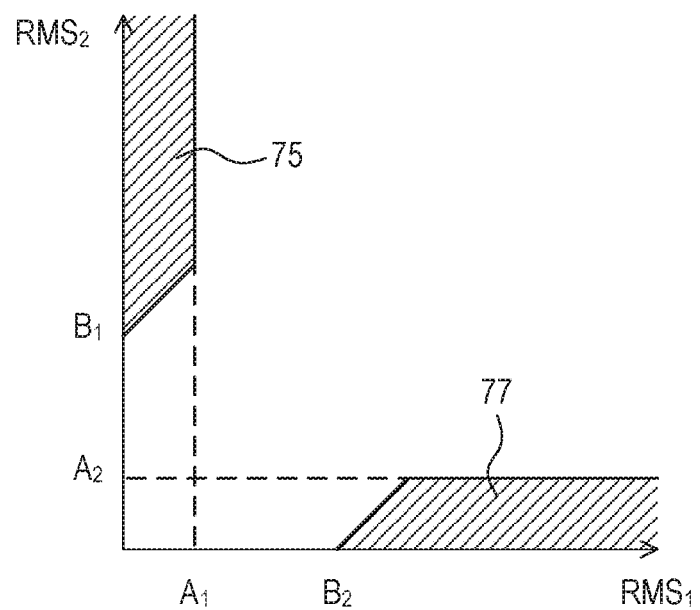
FIG. 7 is an explanatory diagram showing an abnormal condition.

As shown in FIG. 7, the abnormal regions 75 and 77 may be regions having shapes other than a rectangle in the two-dimensional space where the horizontal axis represents the magnitude of the root mean square $RMS_1$ and the vertical axis represents the magnitude of the root mean square $RMS_2$.

As the abnormal condition becomes severer (i.e., as the abnormal regions 75 and 77 become narrower), the combination of the root mean square $RMS_1$ and the root mean square $RMS_2$ becomes less likely to satisfy the abnormal condition in Step 9 described below.

The setting unit 27 includes in advance a table that defines a correspondence relationship between the position P and speed V and the window width W and abnormal condition. Using the table, the setting unit 27 sets the window width W and the abnormal condition corresponding to the position P and the speed V acquired in Step 1. The table is configured such that the above correspondence relationship is rewritable.

The range of the window width W in the table is, for example, in the range from 10 to 1000 msec. The table can be created by, for example, creating a base table and, then repeating the cycle of using the table, verifying the use result, and correcting the table based on the verification result. It is preferable that at least one of the window width W and the abnormal condition in the table change in accordance with the position P and the speed V.

The abnormal condition is determined by the threshold values $A_1$, $A_2$, $B_1$, and $B_2$ as described above when the abnormal condition is a condition shown in FIG. 6. Therefore, setting the abnormal condition with the setting unit 27 is equivalent to setting any one or more of the threshold values $A_1$, $A_2$, $B_1$, and $B_2$.

Returning to FIG. 4, in Step 3, the collected current acquisition unit 11 acquires the current values $I_{1a}$, $I_{1b}$, $I_{2a}$, and $I_{2b}$ by using the current sensors 41, 43, 45, and 47.

In Step 4, the current value determination unit 15 determines whether or not the current values $I_{1a}$ and $I_{1b}$ acquired in Step 3 are within a preset normal range. The normal range is a range of values that the current values $I_{1a}$ and $I_{1b}$ can have when the current sensors 41 and 43 function normally. The process proceeds to Step 5 when the current values $I_{1a}$ and $I_{1b}$ are within the normal range. The process proceeds to Step 15 when the current values $I_{1a}$ and $I_{1b}$ are outside the normal range.

In Step 5, the current value determination unit 15 determines whether or not the current values $I_{2a}$ and $I_{2b}$ acquired in Step 3 are within a preset normal range. The normal range is a range of values that the current values $I_{2a}$ and $I_{2b}$ can have when the current sensors 45 and 47 function normally. The process proceeds to Step 6 when the current values $I_{2a}$ and $I_{2b}$ are within the normal range. The process proceeds to Step 11 when the current values $I_{2a}$ and $I_{2b}$ are outside the normal range.

In Step 6, the collected current acquisition unit 11 calculates the current value $I_1$ by summing the current value $I_{1a}$ and the current value $I_{1b}$ acquired in Step 3.

In Step 7, the collected current acquisition unit 11 calculates the current value $I_2$ by summing the current value $I_{2a}$ and the current value $I_{2b}$ acquired in Step 3.

In Step 8, the first RMS calculation unit 17 calculates the root mean square $RMS_1$ in the window width W of the current value $I_1$ calculated in any one of Step 6, Step 13 described below, and Step 19 described below. The window width W used here is the window width set in Step 2.

In the present Step, the second RMS calculation unit 19 calculates the root mean square $RMS_2$ in the window width W of the current value $I_2$ calculated in any one of Step 7, Step 14 described below, and Step 18 described below. The window width W used here is the window width set in Step 2.

In Step 9, the abnormality determination unit 21 determines whether or not the combination of the root mean square $RMS_1$ and the root mean square $RMS_2$ calculated in Step 8 satisfies the abnormal condition. That is, the abnormality determination unit 21 determines whether or not the combination of the root mean square $RMS_1$ and the root mean square $RMS_2$ calculated in Step 9 belongs to one of the abnormal regions 75 and 77 shown in FIG. 6 or 7. The abnormal condition used here is the abnormal condition set in Step 2.

The process proceeds to Step 10 when it is determined that the abnormal condition is satisfied. The present processing ends when it is determined that the abnormal condition is not satisfied.

In Step 10, the abnormality output unit 23 outputs the abnormality occurrence signal.

The process proceeds to Step 11 when the determination result in Step 5 is negative. In Step 11, the transformer current acquisition unit 7 acquires the current value $I_{p\alpha}$ by using the current sensor 41.

In Step 12, the total collected current calculation unit 9 calculates the current value $I_{all}$ from the current value $I_{p\alpha}$ acquired in Step 11 by using the following Equation (2).

$$I_{all}=I_{p\alpha}\times(M_{all}/M_p) \qquad \text{Equation (2)}$$

In the Equation (2), $M_p$ is the number of the main converters connected to the main transformer 53, and specifically, is three. $M_{all}$ is the sum total of the number of the main converters connected to any one of the main transformers 53, 55, 57, and 59, and specifically, is fourteen.

In Step 13, the collected current acquisition unit 11 calculates the current value $I_1$ by summing the current value $I_{1a}$ and the current value $I_{1b}$ acquired in Step 3.

In Step 14, the collected current calculation unit 13 calculates the current value $I_2$ by subtracting the current value $I_1$, which is calculated in Step 13, from the current value $I_{all}$ calculated in Step 12.

The process proceeds to Step 15 when the determination result in Step 4 is negative. In Step 15, the same determination as that in Step 5 is made. As the result of the determination, the process proceeds to Step 16 when the current values $I_{2a}$ and $I_{2b}$ are within the normal range. The present processing ends when the current values $I_{2a}$ and $I_{2b}$ are outside the normal range.

In Step 16, the transformer current acquisition unit 7 acquires the current value $I_{p\delta}$ by using the current sensor 47.

In Step 17, the total collected current calculation unit 9 calculates the current value $I_{all}$ from the current value $I_{p\delta}$ acquired in Step 16 by using the following Equation (3).

$$I_{all}=I_{p\delta}\times(M_{all}/M_p) \qquad \text{Equation (3)}$$

In the Equation (3), $M_p$ is the number of the main converters connected to the main transformer 59, and specifically, is three. $M_{all}$ is the sum total of the number of the main converters connected to any one of the main transformers 53, 55, 57, and 59, and specifically, is fourteen.

In Step 18, the collected current acquisition unit 11 calculates the current value $I_2$ by summing the current value $I_{2a}$ and the current value $I_{2b}$ acquired in Step 3.

In Step 19, the collected current calculation unit 13 calculates the current value $I_1$ by subtracting the current value $I_2$, which is calculated in Step 18, from the current value $I_{all}$ calculated in Step 17.

When the processing of Steps 11 to 14 is executed, the current collector 37 corresponds to "a current collector or current collectors other than one current collector of the plurality of current collectors" and a current collector X, the current collector 39 corresponds to "one current collector" and a current collector Y, the current value $I_1$ corresponds to a current value $I_X$, and the current value $I_2$ corresponds to a current value $I_Y$. When the processing of Steps 16 to 19 is executed, the current collector 37 corresponds to "one current collector" and a current collector Y, the current collector 39 corresponds to "a current collector or current collectors other than one current collector of the plurality of current collectors" and a current collector X, the current value $I_1$ corresponds to a current value $I_Y$, and the current value $I_2$ corresponds to a current value $I_X$.

3. Effects of Collected Current Monitoring Device 1

(1A) The collected current monitoring device 1 can calculate the current values $I_1$ and $I_2$ with the processing of Steps 11 to 14 even when the current sensors 45 and 47 fail and the current values $I_{2a}$ and $I_{2b}$ cannot be measured directly. Also, the collected current monitoring device 1 can calculate the current values $I_1$ and $I_2$ with the processing of Steps 16 to 19 even when the current sensors 41 and 43 fail and the current values $I_{1a}$ and $I_{1b}$ cannot be measured directly. The collected current monitoring device 1 can detect the electric line separation by using the current values $I_1$ and $I_2$.

(1B) The collected current monitoring device 1 determines whether or not the combination of the root mean square $RMS_1$ and the root mean square $RMS_2$ satisfies the abnormal condition. The abnormal condition is a condition satisfied when the root mean square $RMS_1$ and the root mean square $RMS_2$ are unbalanced, and is a condition satisfied when the electric line separation occurs. Therefore, the collected current monitoring device 1 can determine whether or not the electric line separation occurs based on whether or not the combination of the root mean square $RMS_1$ and the root mean square $RMS_2$ satisfies the abnormal condition.

(1C) The collected current monitoring device 1 sets the window width W and the abnormal condition according to the position P and the speed V of the railway vehicle. Therefore, the collected current monitoring device 1 can optimize the window width W and the abnormal condition according to the position P and the speed V of the railway vehicle. As a result, erroneous detection of the electric line separation can be reduced while improving detection sensitivity to the electric line separation. The position P and the speed V are respectively factors influencing the root mean square $RMS_1$ and the root mean square $RMS_2$.

(1D) As the abnormal condition, the collected current monitoring device 1 can set a condition that the root mean square $RMS_1$ is not more than the threshold value $A_1$ and the root mean square $RMS_2$ is not less than the threshold value $B_1$, or the condition that the root mean square $RMS_1$ is not less than the threshold value $B_2$ and the root mean square $RMS_2$ is not more than the threshold value $A_2$.

Therefore, it is possible to set the abnormal condition merely by setting any one or more of the threshold values $A_1$, $A_2$, $B_1$, and $B_2$. As a result, setting of abnormal conditions is easy. In addition, it is easy to determine whether or not the combination of the root mean square $RMS_1$ and the root mean square $RMS_2$ satisfies the abnormal condition.

(1E) The collected current monitoring device 1 includes a table that defines a correspondence relationship between the position P and speed V and the window width W and abnormal condition, and sets the window width W and the abnormal condition by using the table. Therefore, it is easy to set the window width W and the abnormal condition. The correspondence relationship between the position P and speed V and the window width W and abnormal condition can be easily changed merely by replacing or rewriting the table.

Second Embodiment

1. Differences from First Embodiment

The second embodiment has a basic configuration similar to that of the first embodiment and therefore, the description of the common configuration will be omitted, and the difference will be mainly described. The same reference numerals as those in the first embodiment indicate the same configuration, and reference is made to the preceding description.

Figure 8:
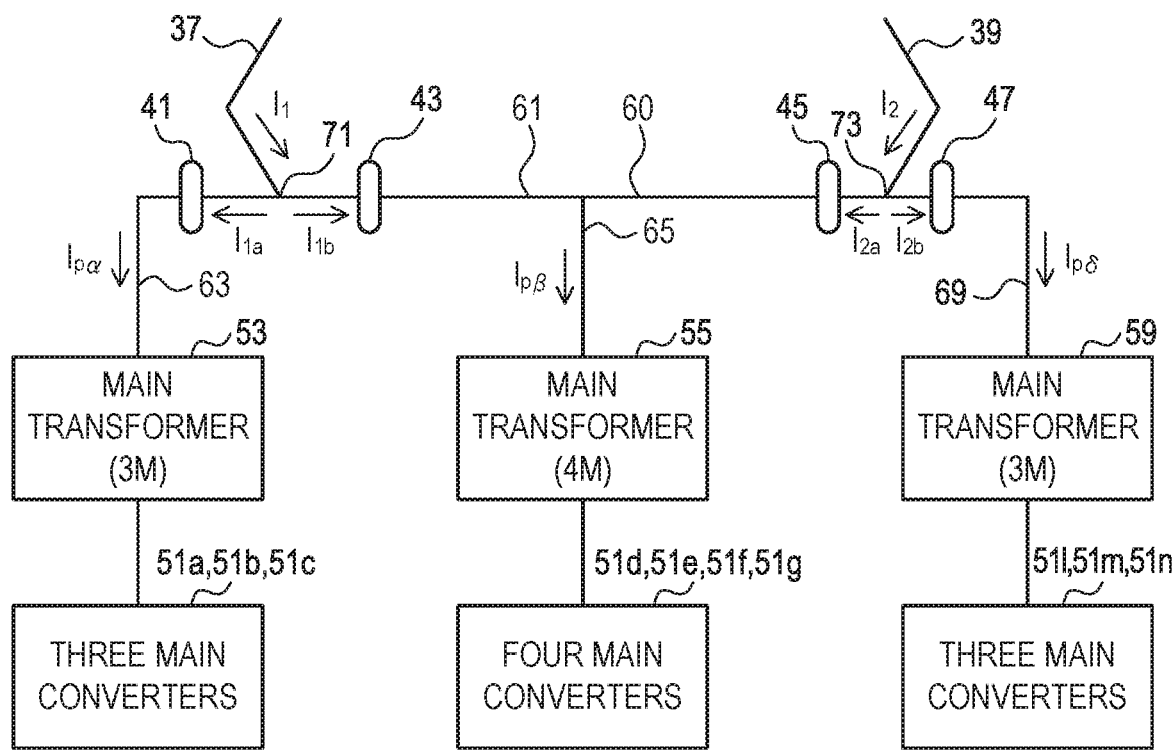

As shown in FIG. 8, the railway vehicle differs from that of the first embodiment in that the railway vehicle does not include the main transformer 57, the four main converters 51h, 51i, 51j, and 51k, and the branch path 67. The sum total of the current value $I_{p\alpha}$, the current value $I_{p\beta}$, and the current value $I_{p\delta}$ is equal to the sum of the current value $I_1$ and the current value $I_2$ (i.e., the current value $I_{all}$).

2. Processing Executed by Collected Current Monitoring Device 1

Processing executed by the collected current monitoring device 1 is basically similar to that of the first embodiment. However, the value of $M_{all}$ in Equations (2) and (3) is the sum total of the number of the main converters connected to any one of the main transformers 53, 55, and 59, and specifically, is ten.

3. Effects of Collected Current Monitoring Device 1

The second embodiment detailed above exerts effects similar to those of the above-described first embodiment.

Third Embodiment

1. Differences from First Embodiment

The third embodiment has a basic configuration similar to that of the first embodiment and therefore, the description of the common configuration will be omitted, and the difference will be mainly described. The same reference numerals as those in the first embodiment indicate the same configuration, and reference is made to the preceding description.

Figure 9:
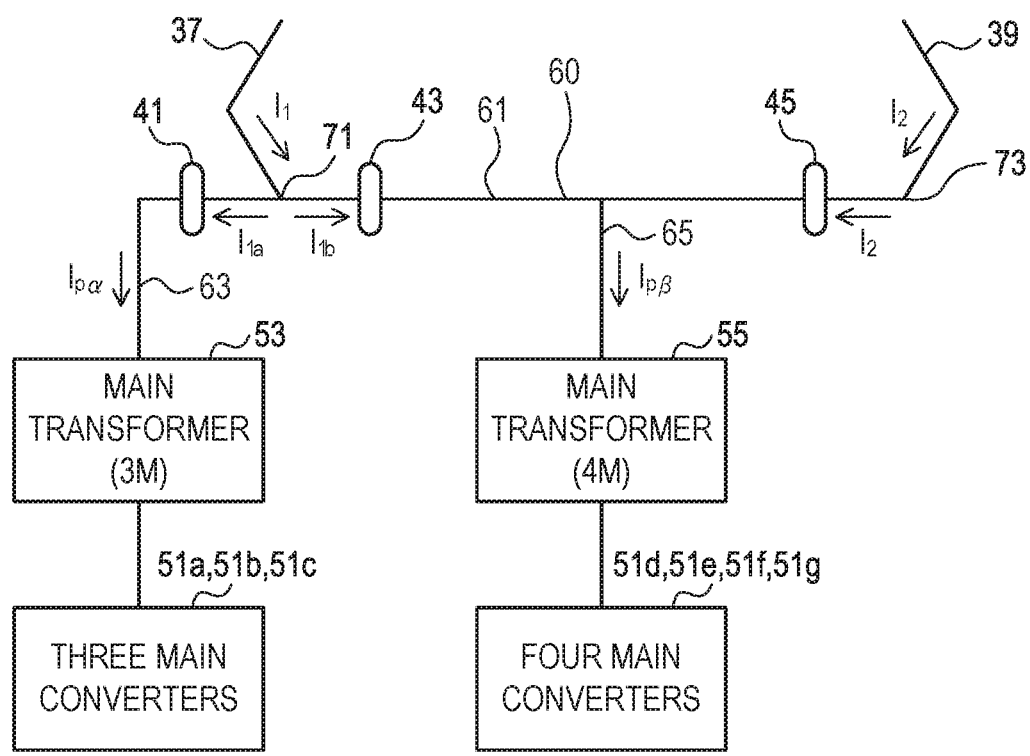

As shown in FIG. 9, the railway vehicle differs from that of the first embodiment in that the railway vehicle does not include the main transformers 57 and 59, the four main converters 51h, 51i, 51j, and 51k, the three main converters 51l, 51m, and 51n, the current sensor 47, and the branch paths 67 and 69. The sum of the current value $I_{p\alpha}$ and the current value $I_{p\beta}$ is equal to the sum of the current value $I_1$ and the current value $I_2$ (i.e., the current value $I_{all}$). The current sensor 45 senses the current value $I_2$.

2. Processing Executed by Collected Current Monitoring Device 1

Processing executed by the collected current monitoring device 1 is basically similar to that of the first embodiment. However, in Step 3, the collected current acquisition unit 11 acquires the current values $I_{1a}$, $I_{1b}$, and $I_2$ by using the current sensors 41, 43, and 45. In Step 5, the current value determination unit 15 determines whether or not the current value $I_2$ sensed with the current sensor 45 is within a preset normal range. The processing ends when the determination result in Step 4 is negative.

The value of $M_{all}$ in Equation (2) is the sum total of the number of the main converters connected to any one of the main transformers 53 and 55, and specifically, is seven.

3. Effects of Collected Current Monitoring Device 1

The third embodiment detailed above exerts effects similar to those of the above-described first embodiment.

Fourth Embodiment

1. Differences from First Embodiment

The fourth embodiment has a basic configuration similar to that of the first embodiment and therefore, the description of the common configuration will be omitted, and the difference will be mainly described. The same reference numerals as those in the first embodiment indicate the same configuration, and reference is made to the preceding description.

Figure 10:
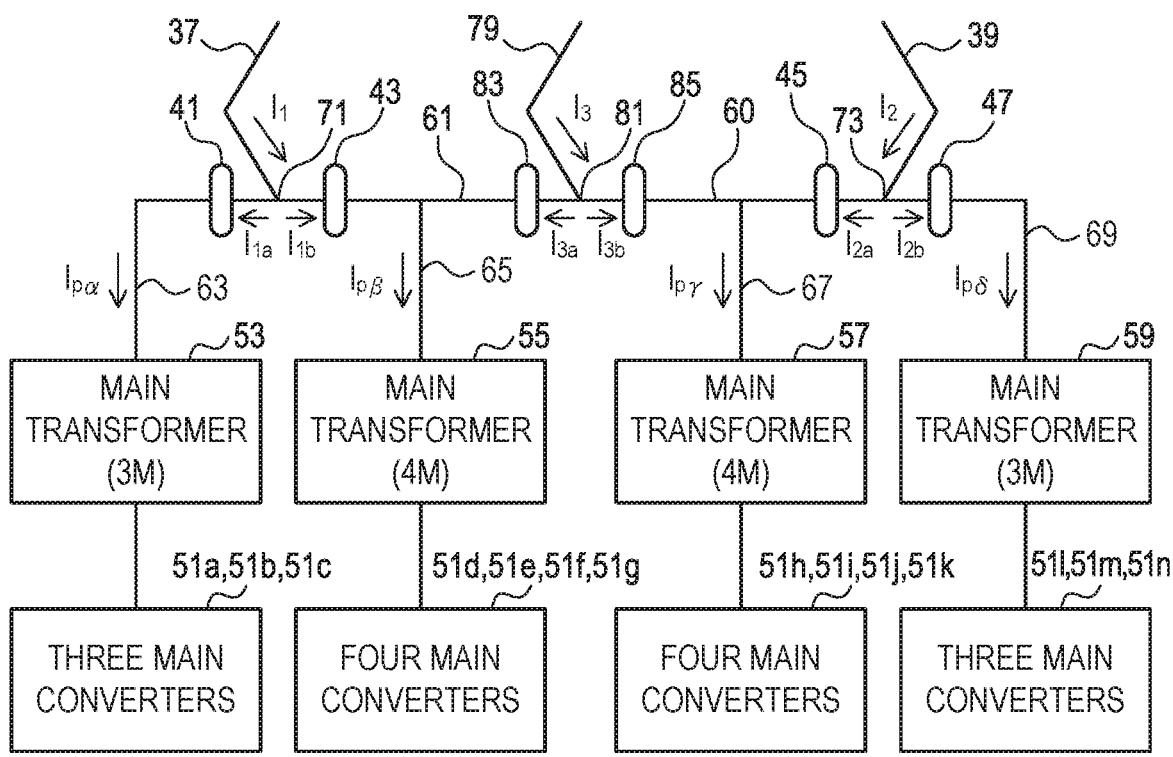

As shown in FIG. 10, the railway vehicle further includes a current collector 79 and current sensors 83 and 85. The current collector 79 supplies a collected current to a current supply point 81 located between a point connected to the branch path 65 and a point connected to the branch path 67 in the main path 61. A current value of the collected current that the current collector 79 supplies to the current supply point 81 is assumed to be $I_3$.

The current sensor 83 is provided between the current supply point 81 and a point connected to the branch path 65 in the main path 61. The current sensor 85 is provided between the current supply point 81 and a point connected to the branch path 67 in the main path 61.

Figure 11:
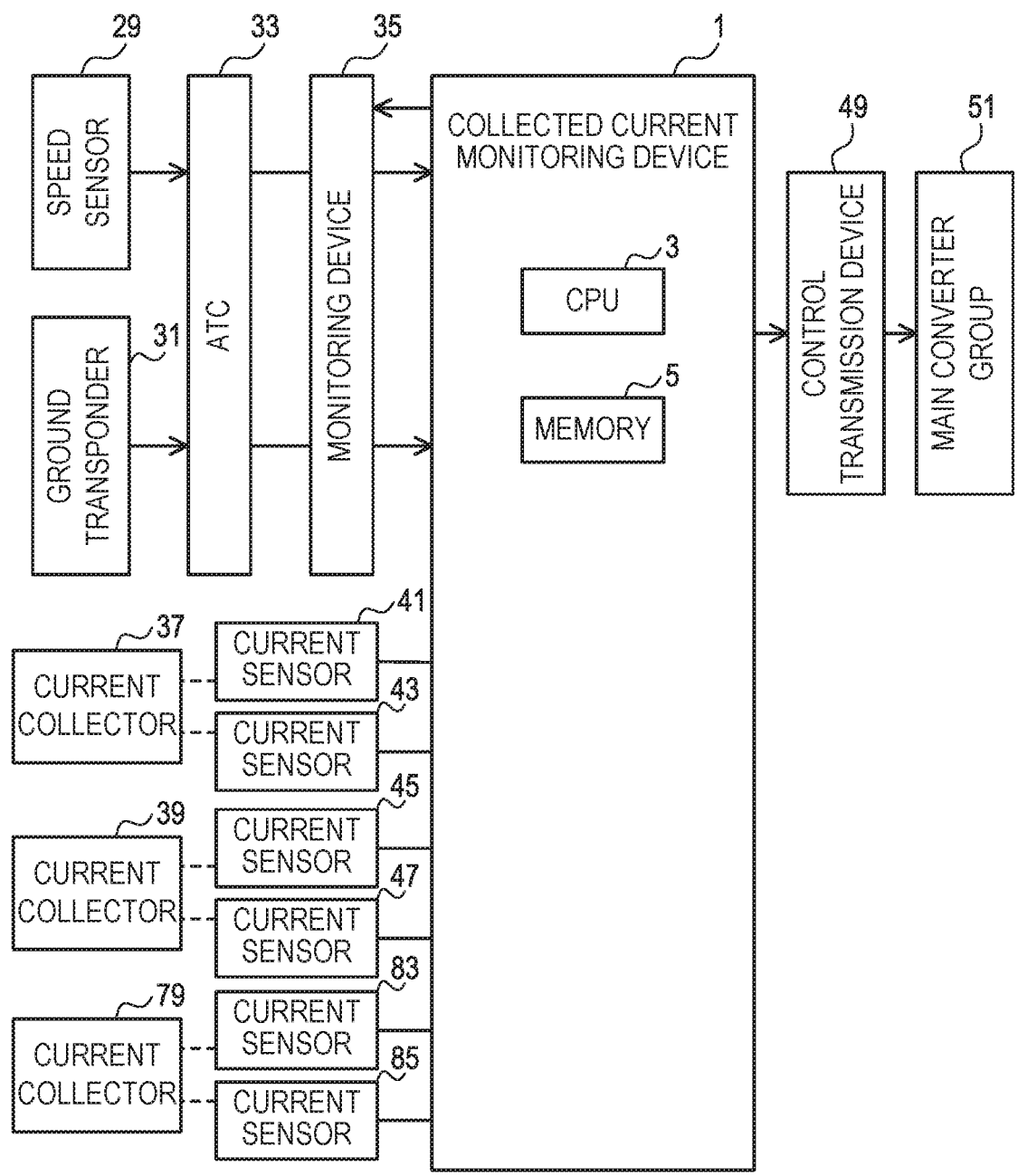
FIG. 11 is a block diagram showing a configuration of a collected current monitoring device and other devices.

Assume that a current value sensed with the current sensor 83 is $I_{3a}$. Assume that a current value sensed with the current sensor 85 is $I_{3b}$. The sum of the current value $I_{3a}$ and the current value $I_{3b}$ is equal to the current value $I_3$. As shown in FIG. 11, each of the current sensors 83 and 85 sends the sensed current value to the collected current monitoring device 1.

In the present embodiment, assume that a current value of all the collected currents supplied by the current collectors 37, 39, and 79 is $I_{all}$. The current value $I_{all}$ is the sum total of the current value $I_1$, the current value $I_2$, and the current value $I_3$.

The sum total of the current value $I_{p\alpha}$, the current value $I_{p\beta}$, the current value $I_{p\gamma}$, and the current value $I_{p\delta}$ is equal to the current value $I_{all}$.

2. Processing Executed by Collected Current Monitoring Device 1

The collected current monitoring device 1 can calculate the current value $I_1$, the current value $I_2$, and the current value $I_3$ by a following method.

First, the current value $I_{p\alpha}$ is acquired by using the current sensor 41. Then, the current value $I_{all}$ is calculated by using the Equation (2). Then, two current values of the current value $I_1$, the current value $I_2$, and the current value $I_3$ are sensed with using any of the current sensors 41, 43, 45, 47, 83, and 85.

For example, it is possible to obtain the current value $I_1$ by adding the current value $I_{1a}$ sensed with the current sensor 41 and the current value $I_{1b}$ sensed with the current sensor 43. In addition, it is possible to obtain the current value $I_2$ by adding the current value $I_{2a}$ sensed with the current sensor 45 and the current value $I_{2b}$ sensed with the current sensor 47. In addition, it is possible to obtain the current value $I_3$ by adding the current value $I_{3a}$ sensed with the current sensor 83 and the current value $I_{3b}$ sensed with the current sensor 85.

Finally, the sum of two current values of the current value $I_1$, the current value $I_2$, and the current value $I_3$ is subtracted from the current value $I_{all}$ to calculate the remaining one current value of the current value $I_1$, the current value $I_2$, and the current value $I_3$.

Alternatively, the current value $I_{all}$ may be calculated by a following method. First, the current value $I_{p\delta}$ is acquired by using the current sensor 47. Then, the current value $I_{all}$ is calculated by using the Equation (3).

Alternatively, the current value $I_{all}$ may be calculated by a following method. First, the current value $I_{p\beta}$ is acquired by using the current sensors 43 and 83. The sum of the current value $I_{1b}$ sensed with the current sensor 43 and the current value $I_{3a}$ sensed with the current sensor 83 is equal to the current value $I_{p\beta}$. Then, the current value all is calculated by using the following Equation (4).

$$I_{all}=I_{p\beta}\times(M_{all}/M_p) \qquad \text{Equation (4)}$$

In the Equation (4), $M_p$ is the number of the main converters connected to the main transformer 55, and specifically, is four. $M_{all}$ is the sum total of the number of the main converters connected to any one of the main transformers 53, 55, 57, and 59, and specifically, is fourteen.

Further alternatively, the current value $I_{all}$ may be calculated by a following method. First, the current value $I_{p\gamma}$ is acquired by using the current sensors 45 and 85. The sum of the current value $I_{2a}$ sensed with the current sensor 45 and the current value $I_{3b}$ sensed with the current sensor 85 is equal to the current value $I_{p\gamma}$. Then, the current value $I_{all}$ is calculated by using the following Equation (5).

$$I_{all}=I_{p\gamma}\times(M_{all}/M_p) \qquad \text{Equation (5)}$$

In the Equation (5), $M_p$ is the number of the main converters connected to the main transformer 57, and specifically, is four. $M_{all}$ is the sum total of the number of the main converters connected to any one of the main transformers 53, 55, 57, and 59, and specifically, is fourteen.

3. Effects of Collected Current Monitoring Device 1

(4A) The collected current monitoring device 1 can calculate each of the current value $I_1$, the current value $I_2$, and the current value $I_3$ even when a part of the current sensors 41, 43, 45, 47, 83, and 85 fails and one of the current values $I_1$, $I_2$, and $I_3$ cannot be directly measured. The collected current monitoring device 1 can detect the electric line separation by using the current values $I_1$, $I_2$, and $I_3$.

Other Embodiments

Embodiments of the present disclosure are described as above, but the present disclosure is not limited to the embodiments, and may take various forms.

(1) The number of the main transformers included in the railway vehicle is not limited to two to four but can be set as appropriate. For example, the number of the main transformers can be five, six, or more.

(2) In Step 11, the current value $I_{p\beta}$ may be acquired instead of the current value $I_{p\alpha}$. The current value $I_{p\beta}$ can be acquired by using a current sensor provided in the branch path 65, for example. When the current value $I_{p\beta}$ is acquired in Step 11, the current value $I_{all}$ can be calculated from the current value $I_{p\beta}$ by using the following Equation (6) in Step 12.

$$I_{all}=I_{p\beta}\times(M_{all}/M_p) \qquad \text{Equation (6)}$$

In the Equation (6), $M_p$ is the number of the main converters connected to the main transformer 55, and specifically, is four. $M_{all}$ is the sum total of the number of the main converters connected to any one of the main transformers 53, 55, 57, and 59, and specifically, is fourteen.

(3) In Step 16, the current value $I_{p\gamma}$ may be acquired instead of the current value $I_{p\delta}$. The current value $I_{p\gamma}$ can be acquired by using a current sensor provided in the branch path 67, for example. When the current value $I_{p\gamma}$ is acquired in Step 16, the current value $I_{all}$ can be calculated from the current value $I_{p\gamma}$ by using the following Equation (7) in Step 17.

$$I_{all}=I_{p\gamma}\times(M_{all}/M_p) \qquad \text{Equation (7)}$$

In the Equation (7), $M_p$ is the number of the main converters connected to the main transformer 57, and specifically, is four. $M_{all}$ is the sum total of the number of the main converters connected to any one of the main transformers 53, 55, 57, and 59, and specifically, is fourteen.

(4) The collected current monitoring device 1 does not need to have the function of performing the processing of Steps 8 to 10. In this case, the collected current monitoring device 1 can output the current values $I_1$ and $I_2$ calculated in any of Steps 6, 7, 13, 14, 18, and 19 to an external device, for example. The external device may perform the processing of Steps 8 to 10 by using the current values $I_1$ and $I_2$ acquired from the collected current monitoring device 1, for example.

(5) The information acquisition unit 25 may acquire either one of the speed V or the position P. In this case, the setting unit 27 may set the window width W and the abnormal condition according to the one of the speed V or the position P.

The information acquisition unit 25 may acquire third information in addition to the speed V and the position P. In this case, the setting unit may set the window width W and the abnormal condition according to the speed V, the position P, and the third information.

(6) The setting unit 27 may set the window width W, but does not need to set the abnormal condition. In this case, the abnormal condition may always be set to a constant condition. Alternatively, the setting unit 27 may set the abnormal condition, but does not need to set the window width W. In this case, the window width W may be a fixed value, for example.

(7) The setting unit 27 may set a part of the threshold values $A_1$, $A_2$, $B_1$, and $B_2$. The threshold values other than the part of the threshold values $A_1$, $A_2$, $B_1$, and $B_2$ may be a fixed value or fixed values, for example.

(8) The abnormal condition may be other conditions. For example, the abnormal condition may be a condition that R expressed by the following Equation 8 is larger than a threshold value $T_X$ or smaller than a threshold value $T_Y$.

$$R = (\text{Root Mean Square RMS}_2)/(\text{Root Mean Square RMS}_1) \qquad \text{Equation 8}$$

The threshold value $T_X$ is a value larger than 1, and the threshold value $T_Y$ is a value larger than 0 and smaller than 1.

(9) The collected current monitoring device 1 may perform the processing of Steps 11 to 14 constantly after Step 3 without performing the determination of Steps 4, 5, and 15. The collected current monitoring device 1 may perform the processing of Steps 16 to 19 constantly after Step 3 without performing the determination of Steps 4, 5, and 15.

(10) The collected current monitoring device 1 may perform the processing of Steps 11 to 14 instead of the processing of Steps 6 and 7 when the determination results in both Steps 4 and 5 are affirmative. The collected current monitoring device 1 may perform the processing of Steps 16 to 19 instead of the processing of Steps 6 and 7 when the determination results in both Steps 4 and 5 are affirmative.

(11) The railway vehicle does not need to include the current sensors 45 and 47. Even in this case, it is possible to calculate the current value $I_2$ by the processing of Steps 11 to 14. The railway vehicle does not need to include the current sensors 41 and 43. Even in this case, it is possible to calculate the current value $I_1$ by the processing of Steps 16 to 19.

What is claimed is:

1. A collected current monitoring device used for a railway vehicle including a plurality of transformers arranged in parallel and a plurality of current collectors configured to supply a collected current to the plurality of transformers, the collected current monitoring device comprising:
   a transformer current acquisition unit configured to acquire a current value $I_p$ of a current flowing through a part of the plurality of transformers;
   a total collected current calculation unit configured to calculate a total current value $I_{all}$ of a collected current supplied by the plurality of current collectors from the current value $I_p$ acquired by the transformer current acquisition unit by using a following Equation (1), $$I_{all} = I_p \times (M_{all}/M_p) \qquad \text{Equation (1)},$$

where $M_p$ is the number of main converters connected to the part of the plurality of transformers, and $M_{all}$ is the sum total of the number of main converters connected to any one of the plurality of transformers;
   a collected current acquisition unit configured to acquire a first current value $I_X$ of a collected current supplied by a current collector or current collectors other than a specific current collector of the plurality of current collectors; and
   a collected current calculation unit configured to calculate a second current value $I_Y$ of a collected current supplied by the specific current collector by subtracting the first current value $I_X$ acquired by the collected current acquisition unit from the total current value $I_{all}$ calculated by the total collected current calculation unit.

2. The collected current monitoring device according to claim 1,
   wherein the railway vehicle includes two current collectors including a first current collector X and a second current collector Y, and
   wherein the first current value $I_X$ is a current value of a collected current supplied by the first current collector X and the second current value $I_Y$ is a current value of a collected current supplied by the second current collector Y.

3. The collected current monitoring device according to claim 2, further comprising:
   a first RMS calculation unit configured to calculate a first root mean square $RMS_X$ of the first current value $I_X$ in a window width W;
   a second RMS calculation unit configured to calculate a second root mean square $RMS_Y$ of the second current value $I_Y$ in the window width W;
   an abnormality determination unit configured to determine whether or not a combination of the first root mean square $RMS_X$ and the second root mean square $RMS_Y$ satisfies a preset abnormal condition; and
   an abnormality output unit configured to output an abnormality occurrence signal when the abnormality determination unit determines that the abnormal condition is satisfied.

4. The collected current monitoring device according to claim 3, further comprising:
   an information acquisition unit configured to acquire railway vehicle information including at least one of a position and a speed of the railway vehicle, and
   a setting unit configured to set a setting item including at least one of the window width W and the abnormal condition according to the railway vehicle information acquired by the information acquisition unit.

5. The collected current monitoring device according to claim 4, further comprising:
   a table for defining a correspondence relationship between the railway vehicle information and the setting item, wherein the setting unit sets the setting item corresponding to the railway vehicle information acquired by the information acquisition unit by using the table.

6. The collected current monitoring device according to claim 3, wherein the abnormal condition is a condition that one of the first root mean square $RMS_X$ and the second root mean square $RMS_Y$ is not more than a threshold value A, and the other of the first root mean square $RMS_X$ and the second root mean square $RMS_Y$ is not less than a second threshold value B larger than the first threshold value A.

* * * * *